(No Model.) 2 Sheets—Sheet 1.

W. WEBSTER.
WATER HEATER AND PURIFIER.

No. 390,538. Patented Oct. 2, 1888.

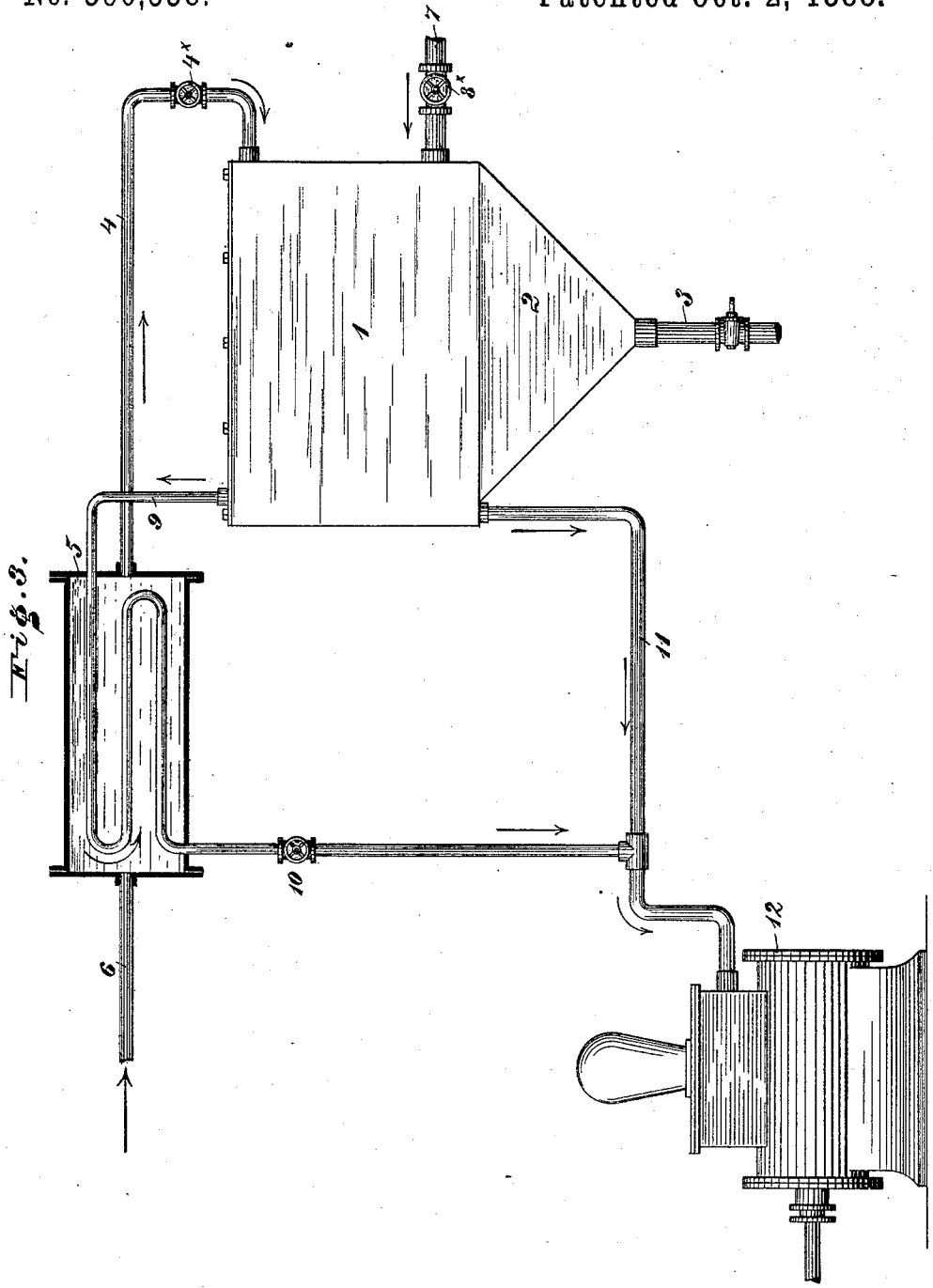

United States Patent Office.

WARREN WEBSTER, OF PHILADELPHIA, PENNSYLVANIA.

WATER HEATER AND PURIFIER.

SPECIFICATION forming part of Letters Patent No. 390,538, dated October 2, 1888.

Application filed May 3, 1888. Serial No. 272,671. (No model.)

*To all whom it may concern:*

Be it known that I, WARREN WEBSTER, a citizen of the United States, residing in the city and county of Philadelphia, State of Pennsylvania, have invented a new and useful Improvement in Water Heaters and Purifiers, which improvement is fully set forth in the following specification and accompanying drawings.

My invention relates to improvements in water evaporators and purifiers.

This invention is especially designed as an improvement upon the apparatus for evaporating and purifying water for which application for Letters Patent was filed by me March 29, 1888, bearing Serial No. 268,859; and the object of this present invention is to provide an apparatus in which all the impurities are entirely removed from the water; also in which the heated vapors from the water are condensed; also in which the pure water and condensed vapors are conducted to a pump to be used, and, finally, in which an improved tank or reservoir for supplying water to the purifying-chamber is provided.

The invention consists in a vaporizing or purifying chamber, a sediment-chamber, means for supplying water to the purifying-chamber, means for supplying steam to the purifying-chamber, and means for conducting the purified water from the purifying-chamber; further, in a purifying-chamber having a series of perforated plates or trays arranged in a zigzag manner therein, a sediment-chamber having vertical plates forming the bottom thereof, means for supplying water to the perforated trays, means for supplying steam to the purifying-chamber, means for conducting the heated vapors from the water to a condenser, means for conducting the pure water from the purifying-chamber for use, and a pump or similar apparatus for receiving the condensed vapors and pure water to be used; and, finally, the invention consists in the novel details of construction, combination, arrangement, and adaptation of parts, all as hereinafter described and specifically claimed.

Figure 1:
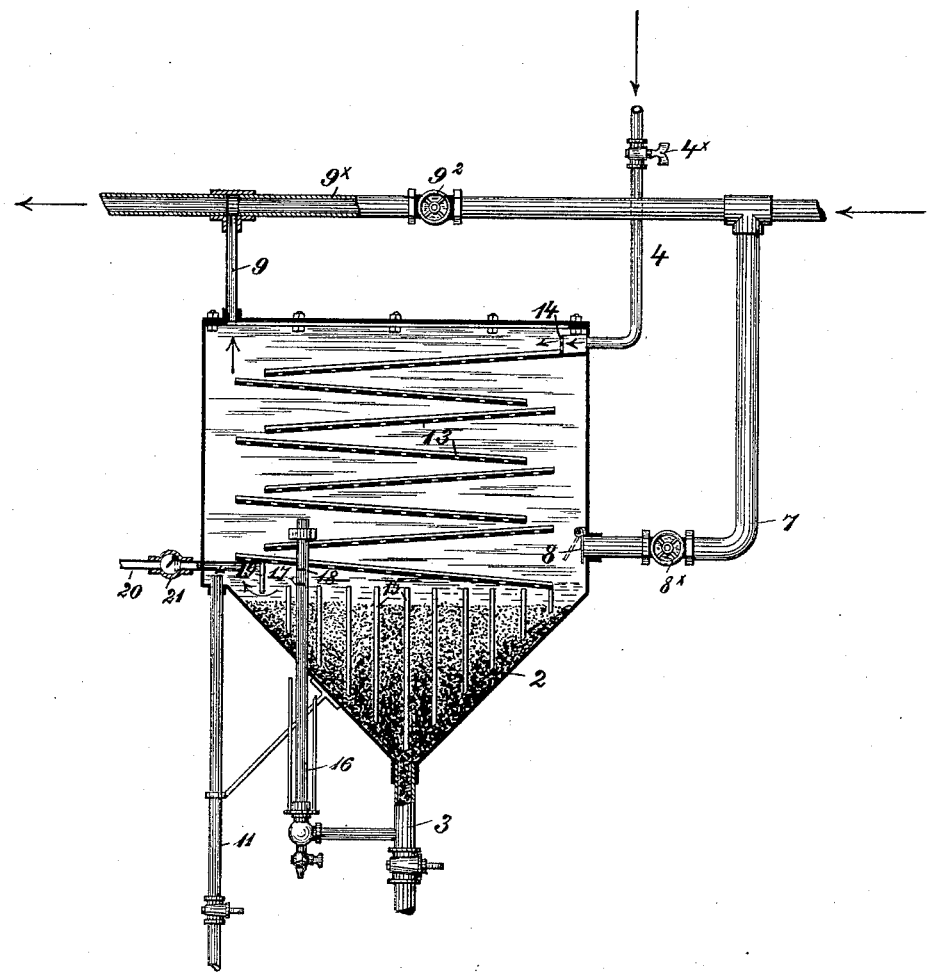
Figure 2:
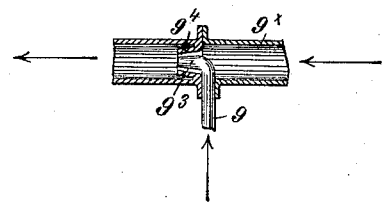

Figure 1 represents a partial side elevation and partial vertical section of a water evaporator and purifier embodying my invention, the condenser and pump not being shown. Fig. 2 represents a detail sectional view of an improved construction of connection between the vapor-pipe and the exhaust-steam pipe. Fig. 3 represents a side elevation of the complete apparatus.

Similar numerals of reference indicate corresponding parts in the several figures.

Referring to the drawings, the numeral 1 designates a chamber or vessel having the mud-well or sediment chamber 2, provided with a discharge-pipe, 3.

4 designates a supply or feed pipe entering the upper portion of the chamber 1, and the said supply-pipe is provided with a cock or valve, $4^\times$, and leads from a tank or reservoir, 5, provided with an inlet, 6.

7 designates a steam-supply pipe entering at the lower portion of the chamber or vessel 1, in order to cause the steam to circulate in the entire chamber. This steam-pipe 7 is provided with a check-valve, 8, which closes outward to prevent the return of steam or backing of water in said pipe, and a cock, $8^\times$.

9 designates a pipe leading from the upper portion of the chamber 1, for carrying the vapor from said chamber, and this pipe passes through the reservoir or tank 5, which condenses the heated vapor in said pipe, and after the vapor has been condensed it passes through a cock or valve, 10, to a pipe, 11, and from thence to a force or steam pump, 12, of any approved pattern.

In Fig. 1 of the drawings the vapor-pipe 9 leads to an exhaust-steam pipe, $9^\times$, and the exhaust-steam pipe is provided with a cock or valve, $9^2$. This construction is employed when it is not desired to condense the vapor from the water, and the connection shown in Fig. 2, in which the vapor-pipe has a bent or goose neck, $9^3$, entering a conical cup, $9^4$, of the exhaust-steam pipe, is the connection preferred between the vapor and exhaust-steam pipe. In this construction no condenser is employed and the vapor passes through the exhaust-steam pipe to the open air. The pipe 11 leads from the lower portion of the chamber or vessel 1 to the pump, and its purpose is to conduct the pure water from the vessel to the pump to be used. From this construction it is evident that the vapors from the vessel or chamber are condensed and conducted to the pump, and the purified water is also conducted thereto.

In the chamber or vessel 1 are arranged, in a zigzag manner, a series of perforated plates or trays, 13, the uppermost plate having a vertical perforated plate or distributing device, 14, arranged thereon. By arranging the plates or trays in this manner it is evident that a zigzag passage or chute for the water is provided, and that the supply or feed pipe directs the water to the distributing device, and from thence it passes to the plates or trays, falling in drops or sprays through the perforations in the said trays.

Within the mud-well or sediment-chamber are secured vertical plates 15, which are separated from each other and from the bottom of said chamber.

Connected with the discharge-pipe 3 of the chamber 2 is the branch pipe of a gage, 16, which is located outside of the chamber 1, and has indicating-marks 17 and 18 thereon relatively to the greatest height that the mud or sediment and water should be permitted to attain in the chambers 1 and 2, it being noticed that the mark 17 is at or about the level of the lower side of the pipe 7, and the mark 18 at or about the level of the top of the plates 15. Connected with or secured in the mud-well or sediment-chamber is a deflector, 19, which rises above the plates 15, for purposes to be hereinafter explained.

The operation is as follows: Water and steam are admitted into the chamber 1 by means of the pipes 4 and 7, respectively. The water after leaving the pipe 4 strikes the plate 14 and passes through the same, so as to be distributed over the top plate or tray, 13. The water flows in part down said plate and escapes in part through the perforations thereof in the form of spray or drops. The water then flows over and through the next tray in a manner similar to that stated, and so continues throughout the series of trays. The water is subjected to the action of the steam and the latent heat of the trays, whereby it is converted into vapor of low tension, the effect of which is the disintegration of the vaporized water and the liberation of the impurities therein, said impurities dropping into the well 2 and settling therein. The pure water rises above the impurities and is directed into the pipe 11, whereby it is directed to the pump to be used. The vapors produced by the steam circulating through the water pass off through the vapor-pipe to the condenser, where they are condensed, and from thence pass through the valve 10 to the pipe 11, and from thence to the pump to be used. Owing to the plates 15 within the well or chamber 2 the agitation or ebullition of the mud or sediment therein is prevented and the settling of the same is facilitated, the purity of the water being also preserved. It will be seen that as the water flows down the trays and drops through the same it is distributed in the form of a shower and vaporized. Consequently all of the animal or mineral matter contained in the water admitted by pipe 4 will be removed and washed down the surface of the trays into the mud-well or sediment-chamber, and the vapor of low tension thus formed will again be converted into liquid as it comes in contact with the sides of the chamber 1. Owing to the arrangement of the trays the water is subjected to the action of the steam both above and below the plates, and the steam entirely surrounds the trays. The water is also caused to travel over the several surfaces of the series of trays sufficiently to cause its evaporation by absorbing the latent heat of said trays should the openings or perforations thereof clog with animal or mineral matter.

The amount of water and steam admitted into the chamber 1 should be regulated or adjusted by the valves or cocks thereof, and the purified water should not rise above the level of the under side of the interior of the pipe 7, so as to avoid interfering with the proper admission of steam into the chamber 1, and the mud or sediment should not rise above the tops of the plates 15, and thus escape into the eduction-pipe 11. To this end the gage 16 has to be watched.

Where exhaust-steam is used, the oil floating upon the water rises above the plate 15, and is prevented from overflowing and escaping with the pure water, owing to the deflector 19, which rises considerably above the plate 15, the purified water, however, flowing under said deflector, and so reaching the eduction or discharge pipe 11.

The plates 13 and 15 may be removably secured in position, so that they may be displaced for purposes of cleansing and repairs.

The lower end of the deflector 19 extends below the level of the outlet-pipe 11 and dips into the water at all times, so that any oil that may accumulate on the water is prevented from reaching the pipe 11.

The oil collected may be removed by closing the valve of pipe 11 and opening that of pipe 3, the oil then running off with the sediment.

In order to prevent the pure water from reaching too great a height in the purifying-chamber, or, in other words, to prevent too quick an accumulation of water, I provide an overflow-pipe, 20, which has a safety-valve, 21, the valve being operated by the water in the overflow-pipe to allow the same to run off, as will be readily understood.

It will be understood that, if desired, the pump can draw the water from the purifying-chamber, and also from the condensing vapor-pipe, or the cock in said pipe can be closed and the pump draw from the purifying-chamber.

In the construction illustrated in Fig. 1 of the drawings the vapor is not condensed, and the pump draws water from the purifying-chamber, as well as the vapor therein, the vapor-pipe carrying off the heated air from said chamber.

Having thus described my invention, what I claim as new, and desire to secure by Letters Patent, is—

1. In a water evaporator and purifier, the combination, with the purifying-chamber, of a steam-pipe, an exhaust-steam pipe connected therewith, a check-valve in said pipe, and a vapor-pipe leading from the purifying-chamber to said pipe, all arranged and adapted to serve substantially as described.

2. The combination of a purifying-chamber having a live-steam-inlet pipe, a vapor-discharge pipe, and a water-discharge pipe, with a condensing-tank, through which said vapor-discharge pipe passes, the said vapor-discharge pipe leading into said water-discharge pipe, substantially as and for the purpose set forth.

3. A purifying-chamber with a sediment-chamber, the purifying-chamber having a water-discharge pipe, a steam-pipe leading into said purifying-chamber, and the vapor-discharge pipe $p$, with goose-neck $9^3$ leading therefrom, and the exhaust steam pipe $9^x$, with inner conical cup, $9^4$, said parts being combined substantially as and for the purpose set forth.

4. The purifying-chamber with plates or trays 13, arranged as described, a steam-pipe leading into said chamber at the lower part thereof, a vapor-discharge pipe at the top of said chamber, a sediment-chamber at the bottom of said purifying-chamber, with vertical plates therein, the water-discharge pipe 11, and a condensing-tank, said vapor-discharge pipe passing through said tank and into said water-discharge pipe, said parts being combined substantially as described.

5. The purifying-chamber with inlet and outlet pipes, a steam-inlet pipe, and an overflow-pipe below the level of the said steam-inlet pipe with check-valve therein, substantially as described.

6. The purifying-chamber with trays 13, arranged as described, inlet and outlet water pipes, a steam-inlet pipe, and a vapor-discharge pipe, a sediment-chamber with vertical plates, a deflector having its top extending above and its bottom below the tops of said vertical plates, and an overflow-pipe below the level of the steam-inlet pipe, said parts being combined substantially as described.

7. The combination, with the purifying-chamber having steam and water supply pipes, of the delivery-pipe leading from the bottom of the purifying-chamber, having a valve, and the vapor-pipe leading from the top of said chamber, and having a valve and communicating with the delivery-pipe, and a pump connected with the delivery-pipe, substantially as shown and described.

WARREN WEBSTER.

Witnesses:
WM. N. MOORE,
JOHN A. WIEDERSHEIM.